(12) United States Patent
Tezaur (10) Patent No.: US 9,235,882 B2
(45) Date of Patent: Jan. 12, 2016

(54) METHOD FOR DETECTING EXISTENCE OF DUST SPOTS IN DIGITAL IMAGES BASED ON LOCALLY ADAPTIVE THRESHOLDING

(75) Inventor: Radka Tezaur, Fremont, CA (US)

(73) Assignee: Nikon Corporation (JP)

( * ) Notice: Subject to any disclaimer, the term of this patent is extended or adjusted under 35 U.S.C. 154(b) by 36 days.

(21) Appl. No.: 14/118,659

(22) PCT Filed: Aug. 16, 2011

(86) PCT No.: PCT/US2011/047915
§ 371 (c)(1),
(2), (4) Date: Nov. 19, 2013

(87) PCT Pub. No.: WO2013/025204
PCT Pub. Date: Feb. 21, 2013

(65) Prior Publication Data
US 2014/0078353 A1 Mar. 20, 2014

(51) Int. Cl.
*H04N 5/217* (2011.01)
*G06T 7/00* (2006.01)
*G06T 5/00* (2006.01)
*G06T 7/40* (2006.01)

(52) U.S. Cl.
CPC ............... *G06T 7/0002* (2013.01); *G06T 5/002* (2013.01); *G06T 7/004* (2013.01); *G06T 7/408* (2013.01); *H04N 5/2171* (2013.01); *G06T 2207/10024* (2013.01); *G06T 2207/20076* (2013.01)

(58) Field of Classification Search
CPC .................................................... H04N 5/2171
USPC ............................................ 348/241, 207.99
See application file for complete search history.

(56) References Cited

U.S. PATENT DOCUMENTS

| | | | |
|---|---|---|---|
| 5,436,979 A | 7/1995 | Gray et al. | |
| 6,233,364 B1 | 5/2001 | Krainiouk et al. | |
| 6,487,321 B1 | 11/2002 | Edgar et al. | |
| 7,206,461 B2 | 4/2007 | Steinberg et al. | |
| 7,620,241 B2 | 11/2009 | Fan et al. | |
| 7,826,675 B2 | 11/2010 | Kisilev | |
| 7,853,097 B2 | 12/2010 | Ishiga | |
| 2005/0068450 A1* | 3/2005 | Steinberg et al. ............. | 348/335 |
| 2008/0069433 A1 | 3/2008 | Corcoran | |
| 2010/0309343 A1 | 12/2010 | Farid | |
| 2010/0321537 A1 | 12/2010 | Zamfir et al. | |

OTHER PUBLICATIONS

The International Preliminary Report on Patentability of the International Searching Authority, Feb. 27, 2014, for Application No. PCT/US2011/047915 (related application).
The International Search Report and the Written Opinion of the International Searching Authority, Dec. 12, 2011, for Application No. PCT/US2011/047915 (related application).

* cited by examiner

*Primary Examiner* — Joel Fosselman
(74) *Attorney, Agent, or Firm* — Roeder & Broder LLP; Steven G. Roeder (57) ABSTRACT

A method for detecting a dust spot (16) in a digital image (10) includes the steps of determining (226) an expected dust spot configuration (344) of the dust spot (16) in the image (10); applying (228) a statistic order filter to a value channel of an HSV color space of the image to generate a filtered value for each pixel being evaluated (349), the filtered value being based upon the expected dust spot configuration (344); and comparing (230) the filtered value to an actual color space value of a plurality of pixels (348) in the digital image (10) to generate (232) a binary image (350). In one embodiment, the method can also include the step of comparing (234) the binary image (350) to the expected dust spot configuration (344) to determine a probability of the presence of the dust spot (16) in the digital image (10).

26 Claims, 9 Drawing Sheets

| Pixel values within filter window | Sorted pixel values |
|---|---|
| 46 | 24 |
| 51 | 26 |
| 58 | 26 |
| 51 | 26 |
| 46 | 27 |
| 51 | 27 |
| 46 | 28 |
| 55 | 28 |
| 54 | 30 |
| 42 | 37 |
| 39 | 38 |
| 47 | 39 |
| 47 | 39 |
| 51 | 40 |
| 50 | 42 |
| 46 | 43 |
| 30 | 44 |
| 27 | 45 |
| 24 | 46 |
| 46 | 46 |
| 49 | 46 |
| 52 | 46 |
| 43 | 46 |

| Pixel values within filter window | Sorted pixel values |
|---|---|
| 28 | 46 |
| 28 | 47 |
| 26 | 47 |
| 38 | 48 |
| 53 | 48 |
| 49 | 48 |
| 40 | 49 |
| 27 | 49 |
| 26 | 50 |
| 26 | 50 |
| 37 | 50 |
| 48 | 51 |
| 45 | 51 |
| 51 | 51 |
| 44 | 51 |
| 39 | 51 |
| 46 | 51 |
| 50 | 51 |
| 51 | 52 |
| 51 | 52 |
| 54 | 53 |
| 48 | 54 |
| 52 | 55 |
| 50 | 55 |
| 55 | 58 |

Fig. 3C

| 49 | 47 | 47 | 47 | 47 | 47 | 48 | 48 | 48 | 48 | 48 |
|---|---|---|---|---|---|---|---|---|---|---|
| 49 | 47 | 47 | 47 | 47 | 47 | 47 | 47 | 48 | 48 | 48 |
| 49 | 47 | 47 | 46 | 45 | 45 | 45 | 47 | 47 | 48 | 48 |
| 47 | 47 | 46 | 42 | 42 | 42 | 42 | 44 | 47 | 48 | 48 |
| 47 | 47 | 46 | 40 | 39 | 39 | 39 | 40 | 45 | 47 | 48 |
| 47 | 47 | 46 | 40 | 39 | 39 | 39 | 40 | 45 | 47 | 48 |
| 47 | 47 | 46 | 40 | 39 | 39 | 39 | 40 | 45 | 47 | 48 |
| 47 | 47 | 46 | 42 | 39 | 39 | 39 | 44 | 46 | 47 | 47 |
| 47 | 47 | 46 | 46 | 46 | 45 | 46 | 46 | 47 | 47 | 47 |
| 47 | 48 | 47 | 47 | 46 | 46 | 47 | 47 | 47 | 47 | 47 |
| 47 | 48 | 48 | 48 | 48 | 47 | 48 | 48 | 48 | 48 | 47 |

Fig. 3D

| 0 | 0 | 0 | 0 | 1 | 0 | 1 | 0 | 0 | 1 | 0 |
|---|---|---|---|---|---|---|---|---|---|---|
| 0 | 0 | 0 | 0 | 0 | 1 | 0 | 0 | 1 | 0 | 0 |
| 1 | 1 | 1 | 0 | 0 | 0 | 0 | 1 | 0 | 0 | 1 |
| 0 | 0 | 0 | 0 | 0 | 0 | 1 | 0 | 0 | 0 | 0 |
| 1 | 1 | 0 | 0 | 1 | 1 | 1 | 0 | 0 | 0 | 0 |
| 0 | 0 | 0 | 1 | 1 | 1 | 1 | 1 | 0 | 0 | 1 |
| 0 | 0 | 1 | 0 | 1 | 1 | 1 | 0 | 0 | 0 | 0 |
| 1 | 0 | 0 | 0 | 0 | 1 | 1 | 0 | 0 | 0 | 1 |
| 0 | 0 | 1 | 0 | 0 | 0 | 0 | 0 | 0 | 0 | 0 |
| 0 | 1 | 0 | 0 | 0 | 0 | 0 | 0 | 1 | 0 | 1 |
| 0 | 0 | 1 | 1 | 0 | 0 | 0 | 0 | 1 | 0 | 0 |

| 0 | 0 | 1/13 | 0 | 0 |
|---|---|---|---|---|
| 0 | 1/13 | 1/13 | 1/13 | 0 |
| 1/13 | 1/13 | 1/13 | 1/13 | 1/13 |
| 0 | 1/13 | 1/13 | 1/13 | 0 |
| 0 | 0 | 1/13 | 0 | 0 |

Fig. 3F

| 0.08 | 0.08 | 0.15 | 0.15 | 0.31 | 0.46 | 0.31 | 0.38 | 0.38 | 0.23 | 0.31 |
|---|---|---|---|---|---|---|---|---|---|---|
| 0.23 | 0.23 | 0.15 | 0.23 | 0.23 | 0.23 | 0.46 | 0.31 | 0.23 | 0.31 | 0.31 |
| 0.46 | 0.38 | 0.23 | 0.15 | 0.31 | 0.31 | 0.38 | 0.23 | 0.23 | 0.38 | 0.15 |
| 0.46 | 0.38 | 0.23 | 0.23 | 0.31 | 0.46 | 0.38 | 0.31 | 0.23 | 0.08 | 0.23 |
| 0.38 | 0.31 | 0.46 | 0.38 | 0.54 | 0.62 | 0.62 | 0.46 | 0.15 | 0.08 | 0.23 |
| 0.31 | 0.31 | 0.31 | 0.46 | 0.62 | 0.92 | 0.77 | 0.38 | 0.23 | 0.23 | 0.23 |
| 0.31 | 0.23 | 0.31 | 0.38 | 0.69 | 0.69 | 0.69 | 0.38 | 0.15 | 0.15 | 0.31 |
| 0.15 | 0.38 | 0.23 | 0.38 | 0.38 | 0.46 | 0.38 | 0.31 | 0.23 | 0.15 | 0.31 |
| 0.31 | 0.23 | 0.31 | 0.15 | 0.23 | 0.23 | 0.23 | 0.15 | 0.15 | 0.23 | 0.31 |
| 0.23 | 0.23 | 0.38 | 0.38 | 0.08 | 0.08 | 0.15 | 0.15 | 0.31 | 0.31 | 0.31 |
| 0.15 | 0.38 | 0.46 | 0.31 | 0.23 | 0.08 | 0.08 | 0.23 | 0.31 | 0.31 | 0.31 |

METHOD FOR DETECTING EXISTENCE OF DUST SPOTS IN DIGITAL IMAGES BASED ON LOCALLY ADAPTIVE THRESHOLDING

BACKGROUND

Cameras are commonly used to capture an image of a scene that includes one or more objects. Many digital cameras include an imaging sensor which may have a filter positioned near the sensor. Unfortunately, dust particles can become attached to the filter and can consequently produce dark spots (also referred to as "dust spots") in a captured image. This problem can be relatively common, particularly with cameras that have interchangeable lenses. Detection of dust particles is important to give a photographer early warning that the sensor and/or filter need cleaning, or to allow automatic removal of dust spots in captured images.

Currently, certain conventional cameras can detect and/or remove dust spots in captured images. However, in these types of cameras, a calibration image of a flat field (such as a blank wall or a sky) that clearly shows the presence of dust particles may be required for creating a dust map. In an alternative method, multiple images taken consecutively are used to create a dust map. Unfortunately, these conventional methods either require an entirely flat field image or multiple images to generate the requisite dust map.

SUMMARY

The present invention is directed to a method for detecting a dust spot in a digital image. In one embodiment, the method includes the steps of determining an expected dust spot configuration of the dust spot in the digital image; applying a statistic order filter to a brightness, luminance, or another similar color space channel, the filtered value being based at least partially upon the expected dust configuration; for each pixel, comparing the filtered value to an actual color space channel value of the same pixel to generate a binary image of the digital image; and comparing the binary image to the expected dust spot configuration to determine the probability of the presence of the dust spot at each location in the digital image.

In one embodiment, the step of determining includes basing the expected dust spot configuration at least partially on an f-stop number used to generate the digital image. In another embodiment, the color space channel includes a value channel of an HSV color space.

In yet another embodiment, the method includes the step of downsampling the digital image. Further, the method can also include the step of denoising the digital image.

In one embodiment, the step of applying includes the filtered value being an nth lowest actual color space value. In this embodiment, n equals the number of pixels in the expected dust spot configuration.

The method can also include the step of generating a dust map of the digital image that excludes any potential dust spots in a non-uniform region of the digital image. In this embodiment, the dust map can include one or more potential dust spots in a uniform region of the digital image.

The method can also include the step of determining a probability of the presence of the one or more dust spots.

The present invention also includes a digital camera that detects a dust spot in a digital image using any of the methods previously described.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The methods provided herein can determine the probability of the presence of one or more dust spots in a digital image. These methods can be incorporated into a digital camera. Alternatively, these methods can be utilized by a processing apparatus that is separate from the digital camera.

Figure 1:
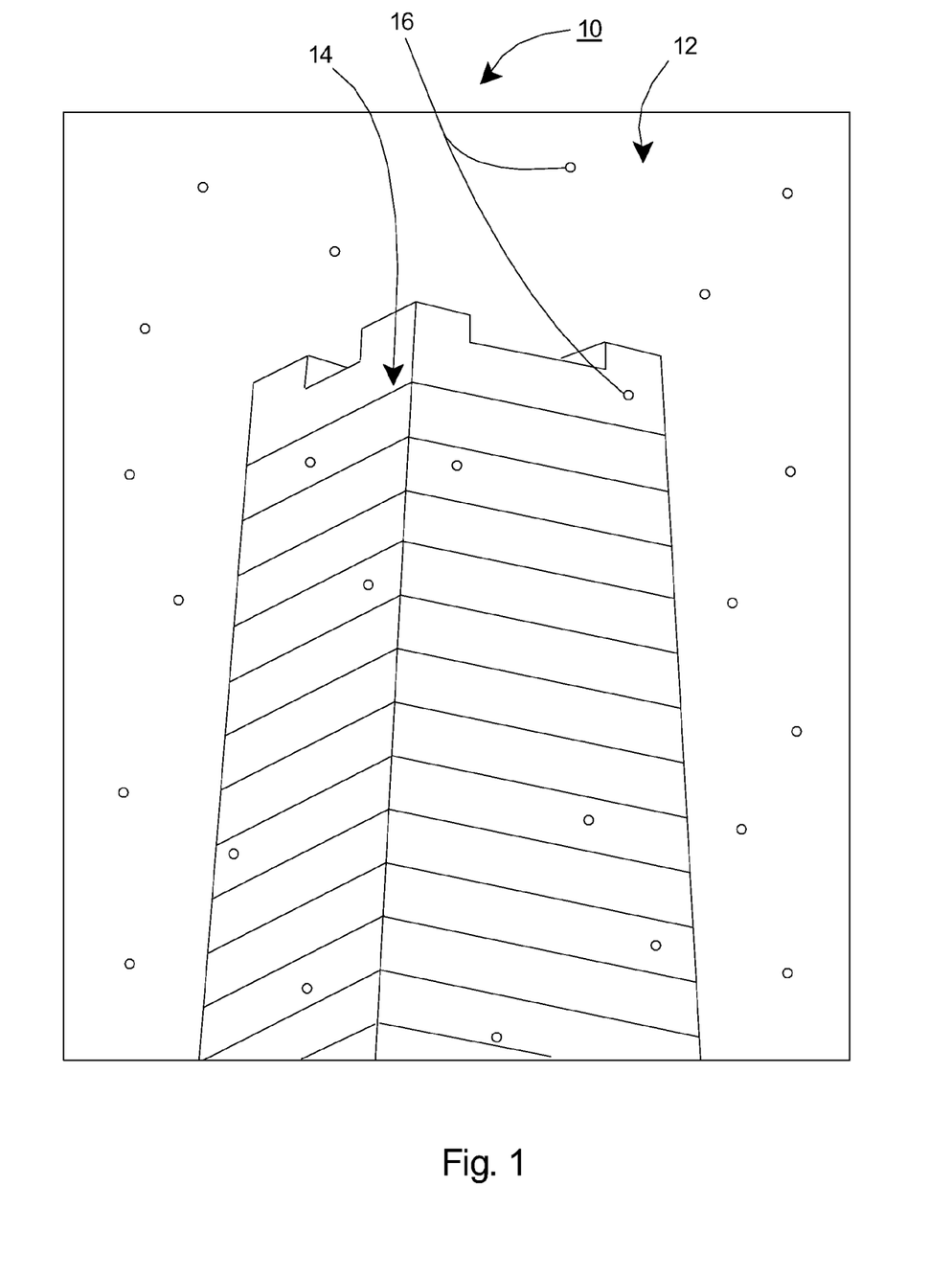
FIG. 1 is a simplified view of an image including one or more uniform regions and one or more non-uniform regions.

FIG. 1 is a simplified representative view of a digital image 10 (also sometimes referred to herein as an "image") which has been taken by a digital camera (not shown). In this embodiment, the digital image includes a uniform region 12 and a non-uniform region 14. In one embodiment, the uniform region 12 can be any relatively uniform background, such as a sky or a blank wall, as non-exclusive representative examples. Further, in one embodiment, the non-uniform region 14 can include any images that are generally non-uniform in appearance, such as buildings, people or trees, as non-exclusive representative examples. The image 10 illustrated in FIG. 1 also includes a plurality of potential dust spots 16 which are positioned within both the uniform region 12 and the non-uniform region 14. The methods provided herein are used to determine whether the potential dust spots 16 on the image 10 are likely actual dust spots which can be removed and/or otherwise addressed by the camera, or by other post-processing apparatuses.

Figure 2:
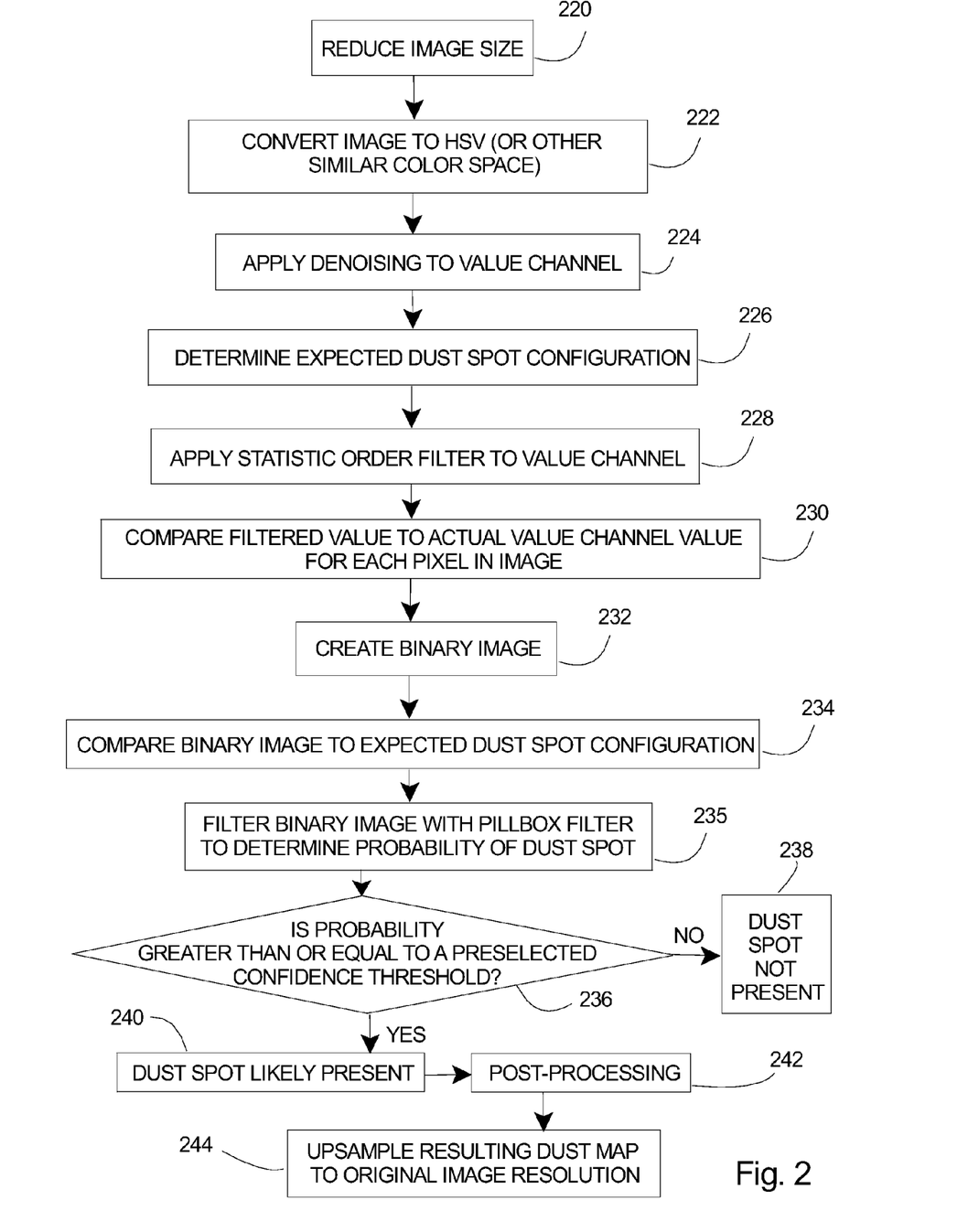
FIG. 2 is a flow chart of one embodiment of a method having steps of the present invention for detecting a dust spot in a digital image.

FIG. 2 is a flow chart of one embodiment of a method having steps of the present invention for detecting a dust spot in a digital image. Some of the steps outlined in the embodiment in FIG. 2 can be omitted depending upon the desired degree of accuracy. Stated another way, not all of the steps shown and described relative to FIG. 2 are essential to carrying out the intent of the present invention.

At step 220, the image to be analyzed can be reduced, i.e. downsampled, if desired. By downsampling the image, some or all of the subsequent computations can be expedited due to a reduced number of pixels that would comprise the image. In one embodiment, the image can be downsampled by approximately 50% in each direction (length and width) so that the downsampled image has approximately 25% of the area of the original image. In alternative embodiments, the downsampled image can have greater than or less than 25% of the area of the original image.

At step 222, the image can be converted from a RGB (red, green, blue) space to a color space that separates a luminance component of the image. For example, in one non-exclusive embodiment, the image can be converted to an HSV color space. As used herein, HSV stands for hue, saturation and value channels. In another non-exclusive embodiment, the image can be converted to an HSL color space (hue, saturation and lightness channels). In still other alternative embodiments, the image can be converted to an HSI (hue, saturation, intensity channels) or HSB (hue, saturation, brightness channels) color space. In other embodiments, the image can be converted to yet another suitable type of color space. Although the embodiments described in greatest detail herein focus on conversion to HSV color space, it is recognized that conversion to any other suitable color space can similarly be accomplished while still carrying out the intent of the present invention.

At step 224, denoising can be applied to the image to improve the performance of the described methods. In one embodiment, the denoising can include using a linear low pass filter. Alternatively, other known methods of denoising can be utilized.

At step 226, an expected dust spot configuration 344 (illustrated in FIG. 3A, for example) is determined. The expected dust spot configuration 344, which can include the size and/or shape of the dust spot, can be determined by analyzing one or more camera settings, such as an f-stop number that was used to obtain the image, as one non-exclusive example. Depending on the specific f-stop number used, the expected dust spot configuration 344, such as the average diameter in number of pixels, can be determined via a look-up table or by another suitable method or calculation. Other non-exclusive factors can include the model and/or type of camera that was used to obtain the image, for example.

Figure 3A:
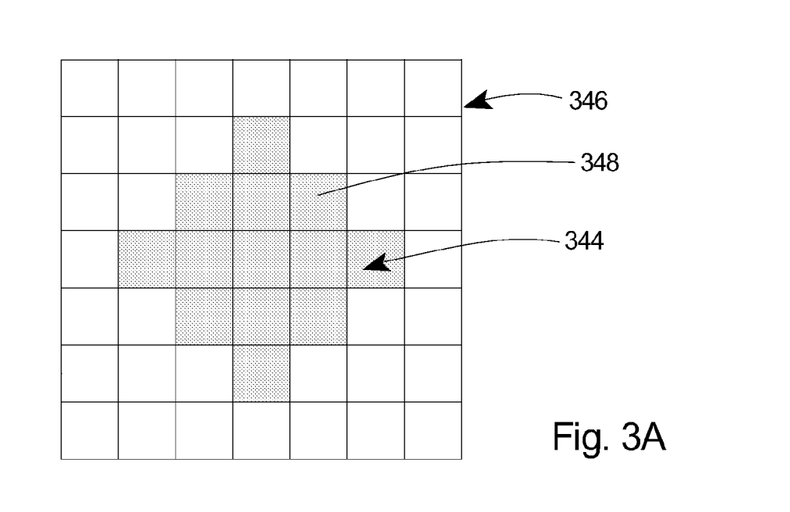
FIG. 3A is a diagram of a filter window including an expected dust spot configuration formed from a plurality of pixels.

At step 228, a statistic order filter is applied to a color space channel of the image. In one embodiment, following conversion from RGB to HSV, the statistic order filter is applied to the value channel. In an alternative embodiment, the statistic order filter is applied to a luminance channel, such as lightness, brightness or intensity, etc. A filter window 346, such as the 7×7 pixel filter window 346 illustrated in FIG. 3A, is utilized that is somewhat larger than the expected dust spot configuration 344. An output (sometimes referred to herein as a "filtered value") of the statistic order filter is the nth lowest value within the filter window 346, where n is some predetermined value derived from the expected dust spot configuration 344. With this design, n is a parameter of the statistical order filter that is derived from the expected dust spot configuration 344.

Referring to FIG. 3A, in one somewhat simplified example, the expected dust spot configuration 344 can have a shape and size similar to that illustrated by pixels within a shaded area of FIG. 3A (one representative pixel is labeled 348 in FIG. 3A). In this example, the filter window 346 has a 7×7 pixel configuration, although it is recognized that the filter window 346 can be any suitable size or configuration, provided the filter window 346 is at least as large as the expected dust spot configuration 344.

Figure 3B:
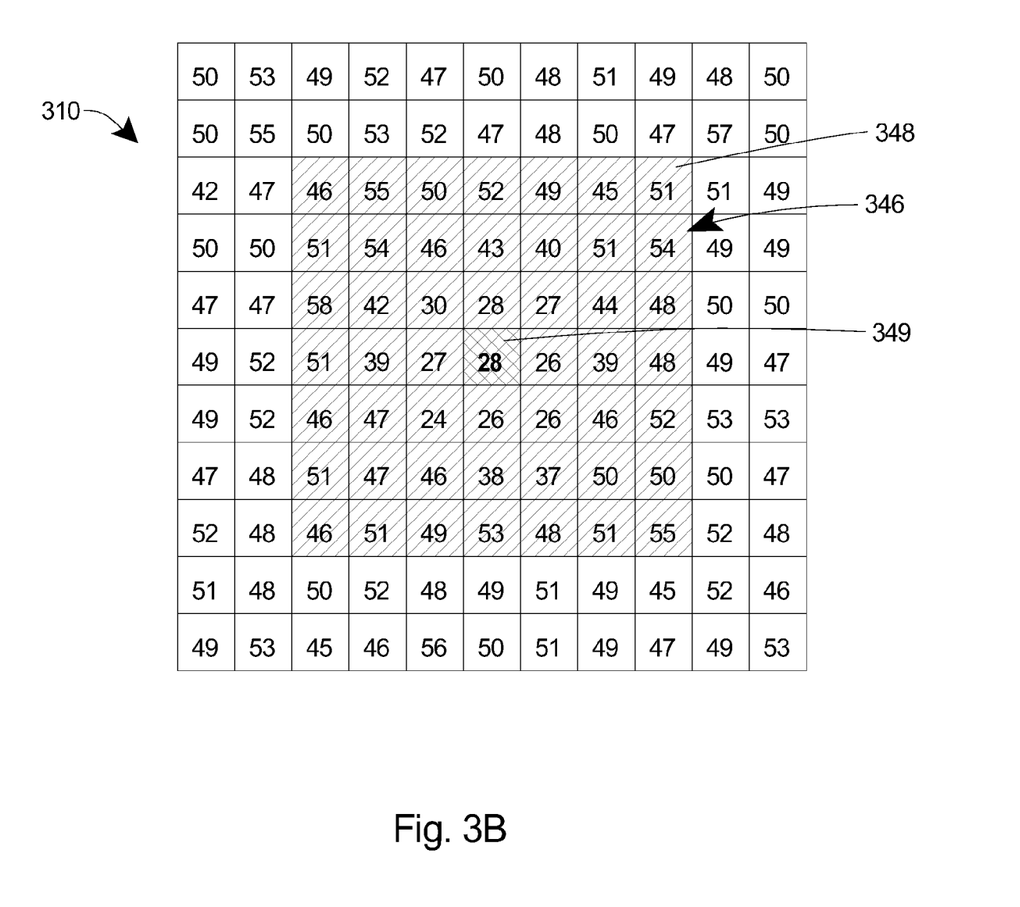
FIG. 3B is a diagram of a portion of the digital image including the filter window illustrated in FIG. 3A, with each pixel having a numerical color space value.

FIG. 3B illustrates that each pixel 348 (only one pixel 348 is labeled in FIG. 3B for clarity) within an image 310 (or portion thereof) can have a color space value that is based on the image value channel. The image 310 represented in FIG. 3B includes the 7×7 pixel filter window 346 (which is shown with diagonal cross-hatching in FIG. 3B). The pixel for which the filtered value ($V_{filtered}$) is currently computed 349 is shown with double cross-hatching in the center of the filter window 346 in FIG. 3B. The color space values are indicated within each pixel 348 in FIG. 3B. As provided previously, in one embodiment, the output of the statistic order filter for the pixel currently being evaluated 349 is determined by the $n^{th}$ lowest color space value within the filter window 346, where n equals the number of pixels in the expected dust spot configuration 344. In this example, n=13 because the expected dust spot configuration 344 (illustrated in FIG. 3A) contains thirteen pixels 348.

Figure 3C:
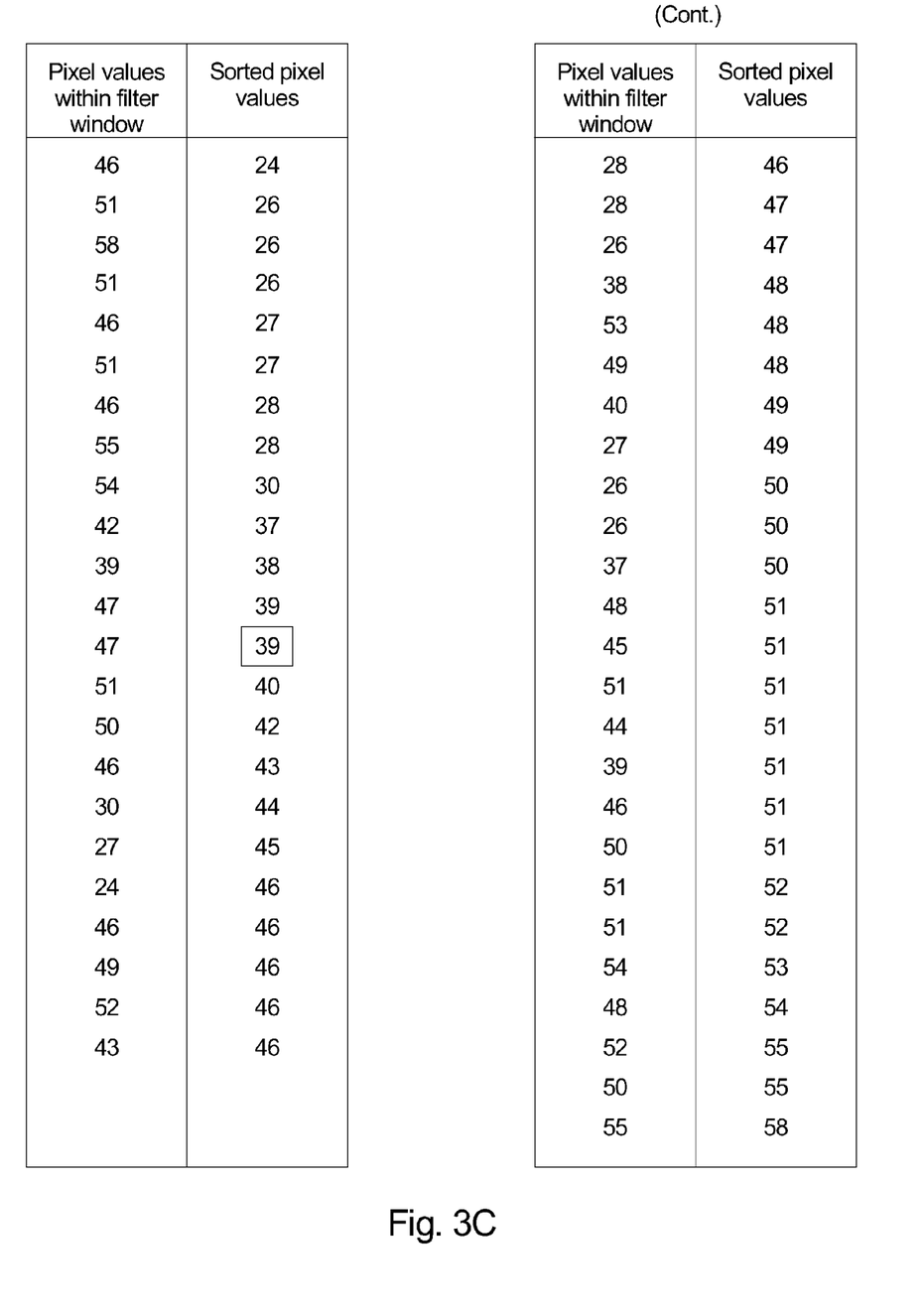
FIG. 3C is a table including non-sorted and sorted color space values for each pixel in the filter window in FIG. 3B.

FIG. 3C is a table that provides an unsorted and a sorted listing of all of the color space values within the 7×7 pixel filter window 346 illustrated in FIG. 3B. In the embodiment illustrated in FIG. 3B, the $13^{th}$ lowest color space value is 39 (shown in a rectangular box in FIG. 3C), which would be the output of the statistic order filter for the pixel currently being evaluated 349 (illustrated in FIG. 3B). As each pixel 348 is evaluated, the filter window 346 in FIG. 3B would shift accordingly so that the pixel being evaluated 349 is in the center of the shifted filter window, such as that shown in FIG. 3B. Stated another way, if the next successive pixel being evaluated were one pixel directly to the right of pixel 349 in FIG. 3B, the entire filter window 346 would likewise shift directly to the right by one pixel. This process continues for each pixel being evaluated in a particular image 310.

Referring back to FIG. 2, at step 230, the filtered value ($V_{filtered}$) at each pixel location is compared to the actual color space value (such as the value channel value) on a pixel-by-pixel basis for each pixel 348 in the image. The filtered value ($V_{filtered}$) is used to threshold the value channel for each pixel, as follows:

$$B(i,j)=1 \text{ if } V(i,j) \le V_{filtered}(i,j),$$

and $$B(i,j)=0 \text{ if } V(i,j) > V_{filtered}(i,j).$$

where B(i,j) is a binary number for the particular pixel at coordinates (i,j) in the image, V(i,j) is the actual color space value for the particular pixel at coordinates (i,j) in the filter window 346, and $V_{filtered}(i,j)$ is the filtered value for each pixel in the image (or portion thereof) as determined previously. Therefore, in this example, each actual color space value is compared to $V_{filtered}(i,j)$, to generate a series of binary values B(i,j) in the configuration of the filter window 346.

Figure 3D:
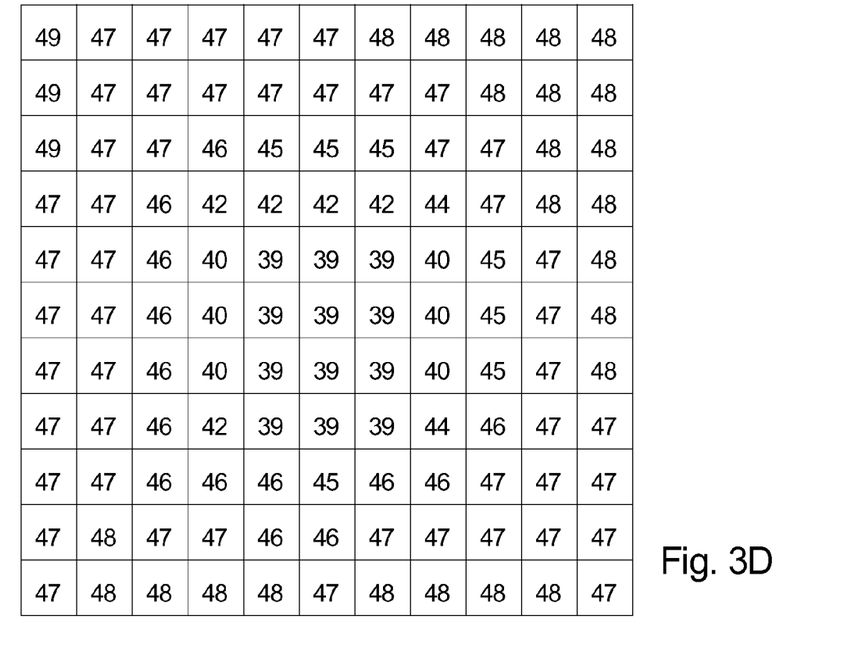
FIG. 3D illustrates the color space values after a statistic order filter has been applied to each pixel in the image in FIG. 3B.

FIG. 3D illustrates the color space values after the statistic order filter has been applied to each pixel in the image 310 in FIG. 3B.

Figure 3E:
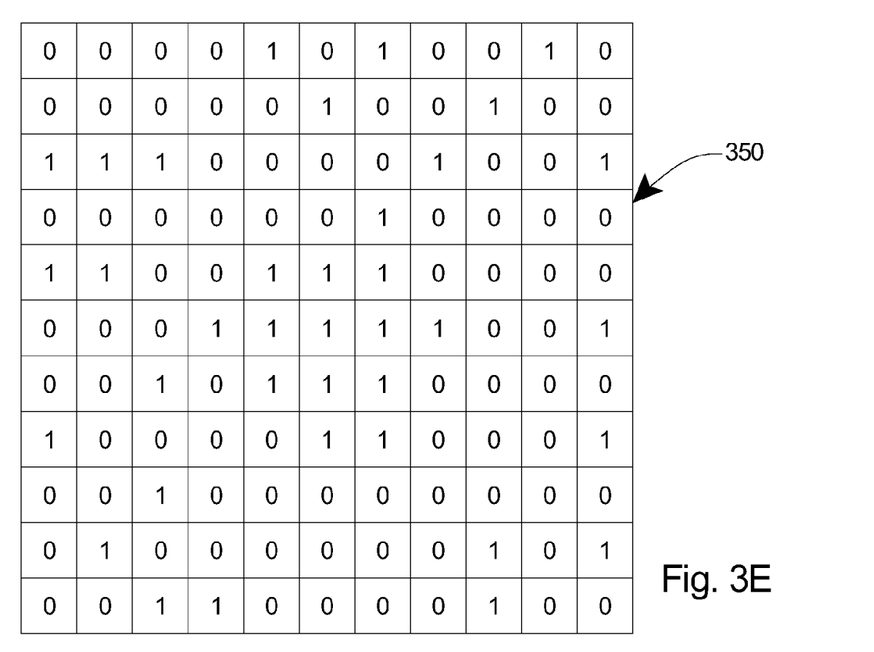
FIG. 3E is a simplified view of a binary image of a potential dust spot following application of a statistic order filter.

At step 232, a binary image 350 (illustrated in FIG. 3E) can be created. FIG. 3E is a representation of the binary image 350 that is created based on the comparison performed in step 230. Based on the expected dust spot configuration 344 (illustrated in FIG. 3A), including its size and shape, the binary image can have any suitable dimensions and can include any suitable number of 0's and 1's.

In the binary image 350, the dust spots can show as an area of pixels having a value of 1 that has a shape that can be somewhat similar to the expected dust spot configuration 344. Further, the dust spot is surrounded by an area of pixels having a value of 0. Areas within the image that do not contain a dust spot look either as a random mixture of 1's and 0's or display somewhat of a different shape than the expected dust spot configuration 344, as explained in greater detail below.

At step 234, the binary image 350 is compared to the expected dust spot configuration 344 to determine the likelihood of the presence of a dust spot in the image.

Figure 3F:
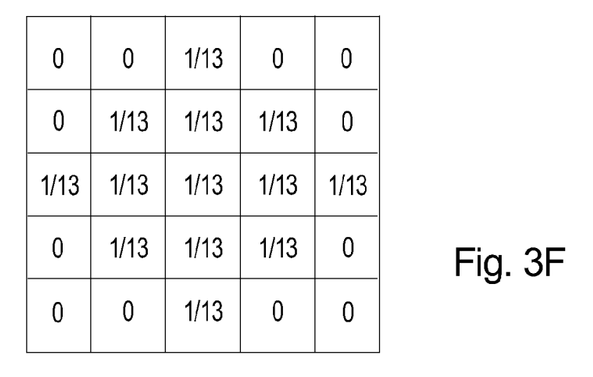
FIG. 3F is a diagram of a linear pillbox filter that is applied to the binary image to evaluate how each pixel matches a binary template of the expected dust spot configuration.

At step 235, a pillbox linear filter (such as that illustrated in FIG. 3F) can be applied to the binary image 350 to evaluate for each pixel how well the neighborhood of the pixel matches a binary template of the expected dust spot configuration 344 (illustrated in FIG. 3A). As used herein, in one embodiment, a "pillbox linear filter" can include a filter with point spread function that looks somewhat like a disk. The disk has a circular area wherein the value within the circular area is constant, except for possibly some anti-aliasing of edges that helps to better approximate a circle in a square pixel grid. For example, in one embodiment, when the expected dust spot configuration 344 is substantially circular, the binary template is a substantially circular template, the diameter of which is an expected dust spot diameter.

Figure 3G:
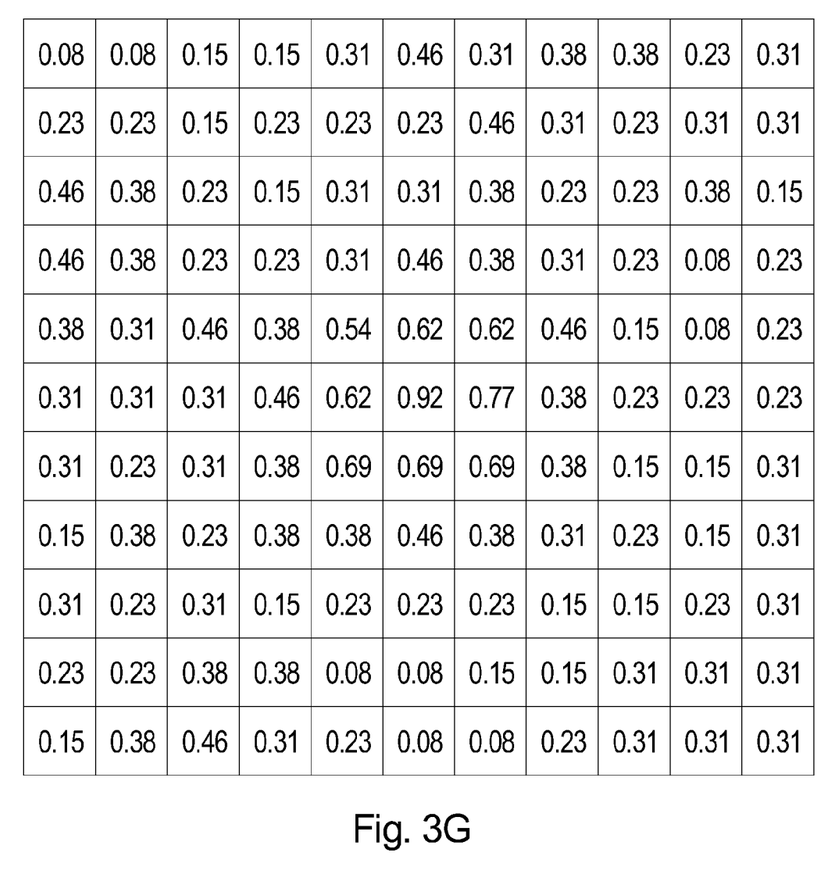
FIG. 3G illustrates an array showing the probability of the presence of a dust spot at any given pixel location within the image in FIG. 3B.

FIG. 3G illustrates an array that results from the previous step(s), and represents the probability of the presence of a dust spot at any given pixel location (i,j).

Figure 3H:
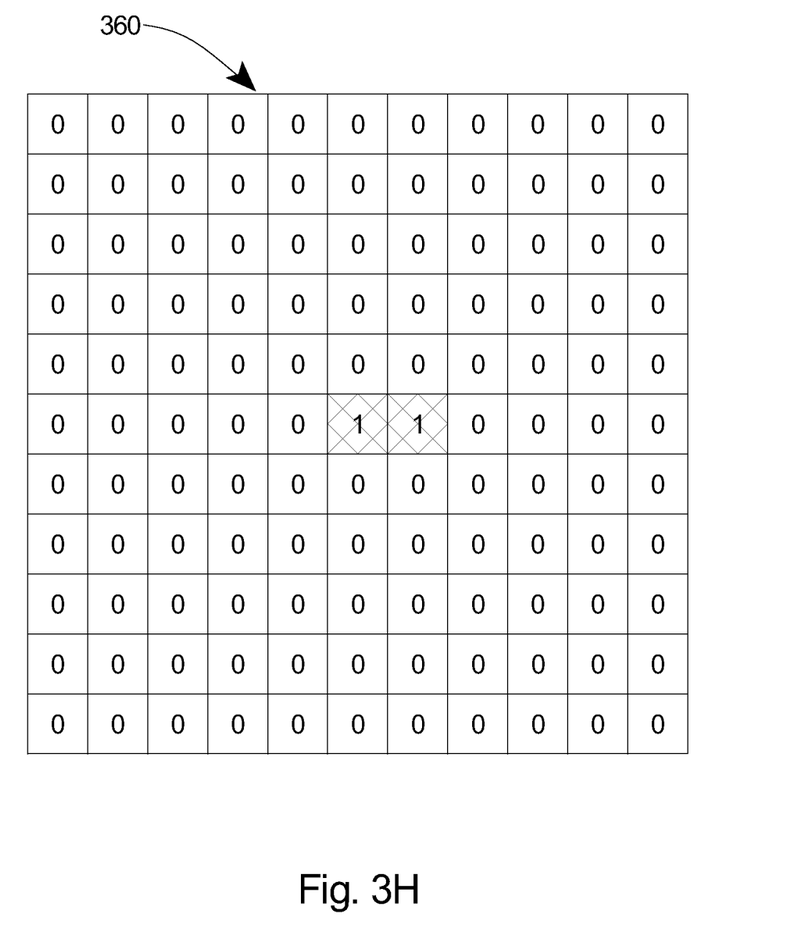
FIG. 3H is a representation of a binary image that is created based on a pre-selected confidence threshold, as applied to FIG. 3G.

FIG. 3H is a representation of a binary image 360 that is created based on a pre-selected confidence threshold, which in this embodiment is $P(i,j) \geq 0.7$, based on the probabilities indicated in FIG. 3G. In this embodiment, a detected dust spot is indicated by the shaded area that covers two adjacent pixels, each containing the number "1". Thresholding with a predetermined confidence level can be used to determine which areas are considered detected dust spots. The value of the confidence threshold that is used can depend upon the saliency of the dust spots that are desired to be detected. In other words, the higher the confidence threshold used, the more salient the dust spots that will be detected. A lower confidence threshold will detect very weak dust spots that are less visible, but will also likely falsely detect dust spots in areas where there is no actual dust spot (also sometimes referred to herein as a "false positive"). Stated another way, the lower the confidence threshold, the higher the risk of false positives.

As an example, using a first confidence threshold, such as 0.70, the binary image 360 in FIG. 3H may be determined to be a dust spot having a size of two pixels (as illustrated by the two cross-hatched pixels in FIG. 3H). However, applying a second confidence threshold to the probabilities indicated in FIG. 3G that is higher than the first confidence level, such as 0.90, the binary image 360 may show a smaller dust spot, or may eliminate the dust spot completely. Conversely, if the second confidence threshold is lower than the first confidence threshold, such as 0.60, the binary image 350 may show a somewhat larger and/or diffuse dust spot.

Therefore, referring back to FIG. 2, at step 236, a determination is made whether the probability of the presence of a dust spot is greater than or equal to a preselected confidence threshold. If not, at step 238, a determination is made that a dust spot is not likely present at that location in the image. If so, at step 240, a determination is made that a dust spot is likely present at that location in the image.

At step 242, in the event that the determination is made that one or more dust spots are likely present in the image, certain post-processing can be performed to reduce the number of false positive results. For example, the process previously described can detect not only dust spots, but can also potentially detect various scene structures from the non-uniform region 14 (illustrated in FIG. 1) of the image.

At step 244, a dust map that results from the previous step(s) can be upsampled to the original image resolution.

Figure 4A:
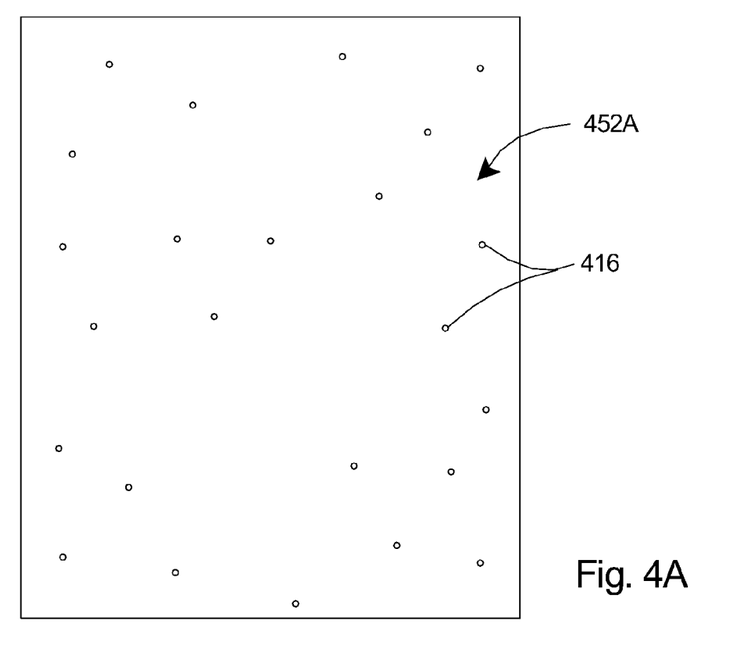
FIG. 4A is a simplified view of a dust map including a plurality of potential dust spots prior to post-processing.

FIGS. 4A-4D illustrate a series of representative images prior to, during, and following one or more post-processing steps. FIG. 4A is a simplified view of a dust map including a plurality of potential dust spots prior to post-processing. In FIG. 4A, all of the potential dust spots 416 (only two of several potential dust spots 416 have been labeled in FIG. 4A) that have been detected using a method previously described herein have been illustrated on a dust map 452A. In this embodiment, the dust map 452A does not include any of the non-uniform regions 14 (illustrated in FIG. 1), but instead only illustrates the locations of the potential dust spots 416 in the image.

Figure 4B:
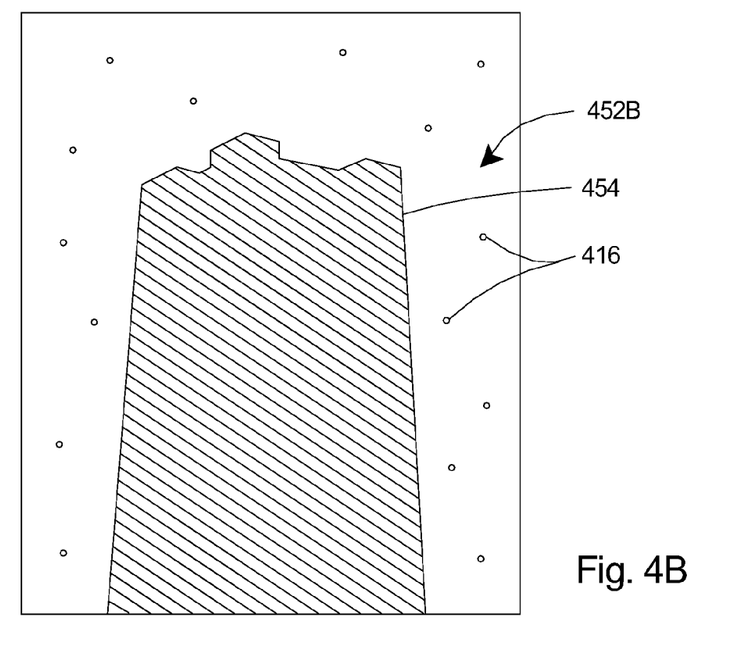
FIG. 4B is a simplified view of a dust map including a plurality of potential dust spots and a mask that covers all potential dust spots in the non-uniform regions during post-processing.

FIG. 4B is a simplified view of a dust map 452B including a plurality of potential dust spots 416 and a mask 454 (shown in cross-hatching) that covers all potential dust spots 416 in the non-uniform regions 14 (illustrated in FIG. 1) during post-processing. In one embodiment, the mask 454 is substantially similar or identical in size and shape to the structures in the image that comprise the non-uniform region 14. In the example illustrated herein, the non-uniform region 14 includes a building. In FIG. 4B, all of the potential dust spots 416 that are in the non-uniform region 14, e.g., that fall within the area of the mask 454 have been removed.

It should be noted that in the alternative to utilizing a mask 454 during a post-processing step, a mask 454 can be used during a pre-processing step to reduce the overall area that is analyzed by the methods provided herein. Stated another way, the detection process described herein can, in one embodiment, only be applied to the uniform region 12, which can be any relatively smooth area of the image 10. With this design, computation time can be reduced.

Further, in one embodiment, a pre-processing step can be incorporated which determines what areas of the image 10 are uniform regions 12 versus non-uniform regions 14, so that the previously described embodiment can be better implemented. Any recognized method that is known in the art can be utilized for segregating the uniform region 12 from the non-uniform region 14.

Figure 4C:
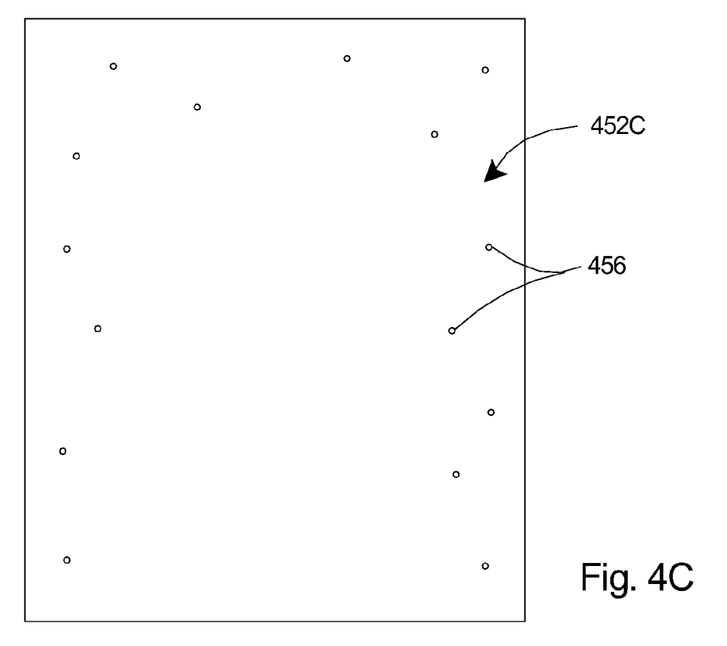
FIG. 4C is a simplified view of a final dust map including a plurality of dust spots detected at a first confidence level.

FIG. 4C is a simplified view of a final dust map 452C with the mask 454 illustrated in FIG. 4B omitted. In this embodiment, the final dust map 452C includes a plurality of dust spots 456 detected at a first confidence threshold. Stated another way, the threshold used for determining the degree of similarity between the binary image 350 (illustrated in FIG. 3E) and the expected dust spot configuration 444 (illustrated in FIG. 4A) can be adjusted to suit the needs of the user. In the example illustrated in FIG. 4C, the confidence threshold for the probability of the presence of a dust spot 456 is set at $P > 0.70$, although it is recognized that any suitable alternative confidence threshold can be used. In other words, in this example, the probability of a potential dust spot being an actual dust spot is greater than 70%.

Figure 4D:
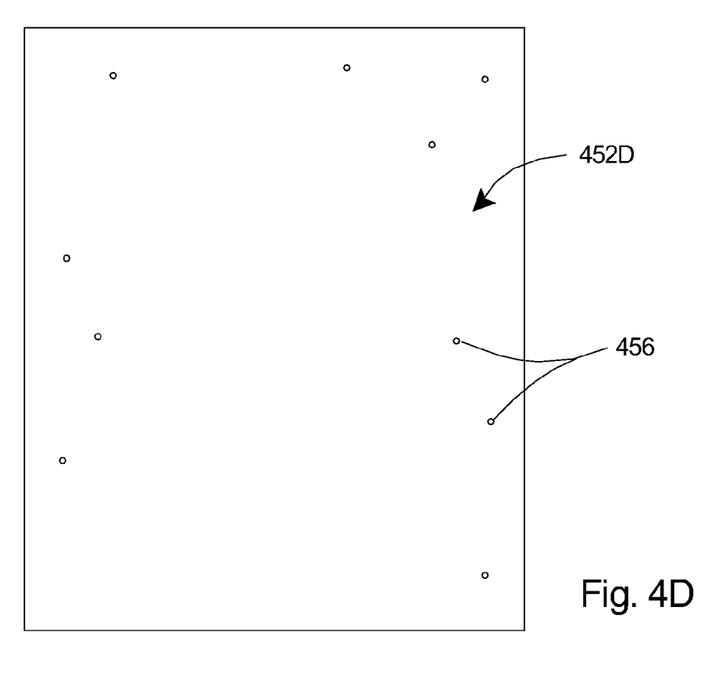
FIG. 4D is a simplified view of a final dust map including a plurality of dust spots detected at a second confidence level.

FIG. 4D is a simplified view of a final dust map 452D with the mask 454 illustrated in FIG. 4B omitted. In this embodiment, however, the final dust map 452D includes a plurality of dust spots 456 detected at an alternative second confidence threshold. In other words, in this embodiment, a different confidence threshold from that described relative to FIG. 4C is utilized. The confidence thresholds described in FIGS. 4C and 4D are intended to represent two alternative thresholds. Stated another way, it is not necessary nor required that any two or more confidence thresholds be utilized with the methods provided herein. Thus, in these embodiments, only one confidence threshold is utilized. Alternatively, more than one confidence threshold can be used, and the results of using different confidence thresholds can be compared to one another, if desired.

In the example illustrated in FIG. 4D, the confidence threshold for the probability of the presence of a dust spot 456 is set at P>0.90. In other words, in this example, the probability of a potential dust spot being an actual dust spot is greater than 90%. Because the second confidence threshold is higher than the first confidence threshold, a more discriminate determination of the presence of a dust spot occurs. Thus, in FIG. 4D, fewer dust spots 456 are included on the dust map 452D. However, the actual existence of these dust spots is more likely than the dust spots illustrated in the dust map 452C in FIG. 4C.

In the embodiments illustrated and described relative to FIGS. 4C and 4D, it is recognized that by setting a different value of the threshold, the sensitivity of the method and the risk of detecting false positives can be manipulated. Additionally, these post-processing steps can be performed to accomplish one or more of determining (i) whether a gradient in the value channel exceeds a certain threshold, i.e. because dust spots are blurry, the gradient is relatively low; if the gradient is relatively high, the potential dust spot is more likely to be part of the image content than an actual dust spot; and/or (ii) whether the gradient in hue channel is small enough (because a dust particle influences mostly the value (or luminance) while the hue remains substantially unchanged, if the area is not substantially constant in the hue channel, the potential dust spot is more likely to be part of the image content than an actual dust spot.

While a number of exemplary aspects and embodiments have been discussed above, those having skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for detecting a dust spot in a digital image having a plurality of pixels, the method comprising the steps of:
   determining an expected dust spot configuration of the dust spot in the image;
   applying a statistic order filter to a color space channel for each of the plurality of pixels in the digital image to generate a filtered value for each of the plurality of pixels, the filtered value being an nth lowest actual color space within a filter window that encircles the expected dust spot configuration, wherein n is a parameter of the statistic order filter that is based on the number of pixels in the expected dust spot configuration so that the filtered value is based at least partially upon the expected dust spot configuration; and
   comparing the filtered value to an actual color space value of each of the plurality of pixels to generate a binary image of the digital image.

2. The method of claim 1 further comprising the step of comparing the binary image to the expected dust spot configuration to determine a probability of the presence of the dust spot in the digital image.

3. The method of claim 1 wherein the step of determining includes basing the expected dust spot configuration at least partially on a camera setting on a camera used to generate the digital image.

4. The method of claim 1 wherein the step of determining includes basing the expected dust spot configuration at least partially on an f-stop number used to generate the digital image.

5. The method of claim 1 wherein the color space channel includes a value channel of an HSV color space.

6. The method of claim 1 further comprising the step of downsampling the digital image prior to the step of determining.

7. The method of claim 1 further comprising the step of denoising the digital image prior to the step of determining.

8. The method of claim 1 wherein the step of applying includes n being equal to the number of pixels in the expected dust spot configuration.

9. The method of claim 1 further comprising the step of generating a dust map of the digital image that excludes any potential dust spots in a non-uniform region of the digital image.

10. The method of claim 9 wherein the step of generating includes the dust map including one or more potential dust spots in a uniform region of the digital image.

11. The method of claim 10 further comprising the step of generating includes determining a probability of likelihood of the presence of the one or more dust spots.

12. The method of claim 1 further comprising the step of converting the digital image to an HSV color space prior to the step of applying.

13. A digital camera that detects a dust spot in a digital image using the method of claim 1.

14. A method for detecting a dust spot in a digital image having a plurality of pixels, the method comprising the steps of:
    determining an expected dust spot configuration of the dust spot in the image;
    applying a statistic order filter to a color space channel for each of the plurality of pixels in the digital image to generate a filtered value for each of the plurality of pixels, wherein the filtered value is an nth lowest actual color space value within a filter window that encircles the expected dust spot configuration, wherein n is derived from the expected dust spot configuration so that the filtered value is based at least partially upon the expected dust spot configuration;
    comparing the filtered value for each of the plurality of pixels to an actual color space value of each of the plurality of pixels to generate a binary image of the digital image; and
    comparing the binary image to the expected dust spot configuration to determine a probability of the presence of the dust spot in the digital image.

15. The method of claim 14 wherein the step of determining includes basing the expected dust spot configuration at least partially on a camera setting on a camera used to generate the digital image.

16. The method of claim 14 wherein the step of determining includes basing the expected dust spot configuration at least partially on an f-stop number used to generate the digital image.

17. The method of claim 14 further comprising the step of downsampling the digital image prior to the step of determining.

18. The method of claim 14 further comprising the step of denoising the digital image prior to the step of determining.

19. The method of claim 14 wherein the step of applying includes n being equal to the number of pixels in the expected dust spot configuration.

20. The method of claim 14 further comprising the step of generating a dust map of the digital image that excludes any potential dust spots in a non-uniform region of the digital image.

21. The method of claim 20 wherein the step of generating includes the dust map including one or more potential dust spots in a uniform region of the digital image.

22. The method of claim 21 further comprising the step of generating includes determining a probability of likelihood of the presence of the one or more dust spots.

23. The method of claim 14 further comprising the step of converting the digital image to an HSV color space prior to the step of applying.

24. A digital camera that detects a dust spot in a digital image using the method of claim 14.

25. A method for detecting a dust spot in a digital image having a plurality of pixels, the method comprising the steps of:
   downsampling the digital image;
   denoising the digital image;
   determining an expected dust spot configuration of the dust spot in the digital image, the expected dust spot configuration being based at least partially on an f-stop number used to generate the digital image;
   applying a statistic order filter to a value channel of an HSV color space for each of the plurality of pixels in the image to generate a filtered value for each of the plurality of pixels, the filtered value being an nth lowest actual color space value within a filter window that encircles the expected dust spot configuration, where n is approximately equal to the number of pixels in the expected dust spot configuration;
   comparing the filtered value to an actual color space value of each of the plurality of pixels to generate a binary image of the digital image;
   comparing the binary image to the expected dust spot configuration to determine a probability of the presence of the dust spot in the digital image;
   generating a dust map of the digital image that excludes any potential dust spots in a non-uniform region of the digital image, and includes one or more potential dust spots in a uniform region of the digital image; and
   determining a probability of likelihood of the presence of the one or more dust spots.

26. The method of claim 14 wherein applying includes the color space channel including a luminance component.

* * * * *